E. W. BLUM.
GEARING.
APPLICATION FILED JAN. 17, 1912.

1,028,095.

Patented June 4, 1912.

2 SHEETS—SHEET 1.

Witnesses
Victor E. Jullin
Goldie Gordon

Inventor
Edward W. Blum
By James N. Ramsey
Attorney

E. W. BLUM.
GEARING.
APPLICATION FILED JAN. 17, 1912.
1,028,095.
Patented June 4, 1912.
2 SHEETS—SHEET 2.
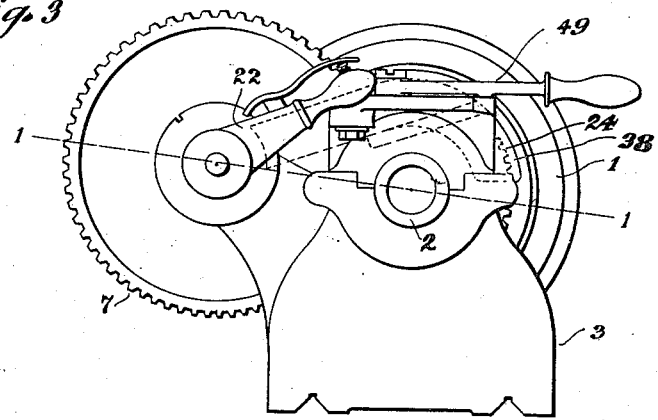
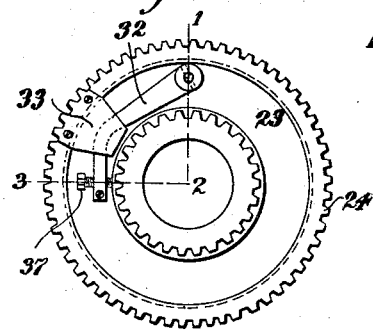
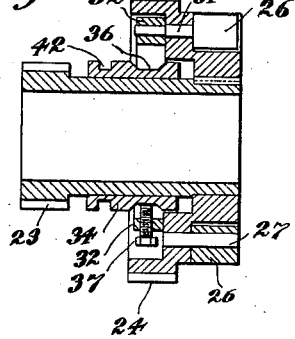
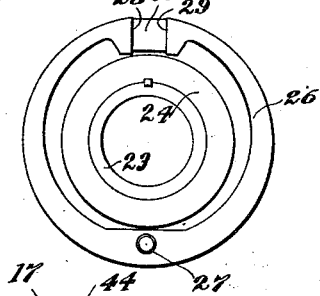
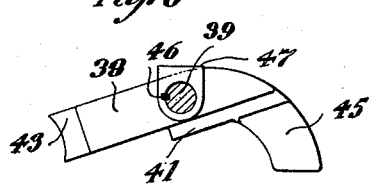
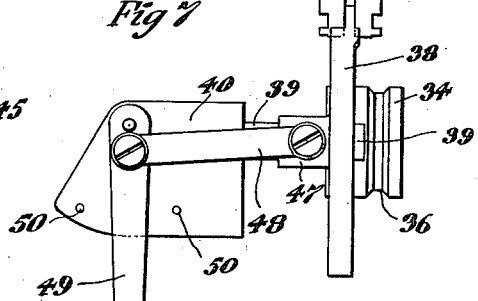
Witnesses
Victor E. Jullium
Goldie Gordon
Inventor
Edward W. Blum
By James N. Ramsey
Attorney

UNITED STATES PATENT OFFICE.

EDWARD W. BLUM, OF CINCINNATI, OHIO, ASSIGNOR TO THE BRADFORD MACHINE TOOL COMPANY, OF CINCINNATI, OHIO, A CORPORATION OF OHIO.

GEARING.

1,028,095. Specification of Letters Patent. Patented June 4, 1912.

Application filed January 17, 1912. Serial No. 671,685.

*To all whom it may concern:*

Be it known that I, EDWARD W. BLUM, a citizen of the United States, residing at Cincinnati, in the county of Hamilton and State of Ohio, have invented certain new and useful Improvements in Gearing, of which the following is a specification.

My invention relates to improvements in back gear lathes.

The object of my invention is to bring into operation different back gear driving means or gear runs for changing the spindle speed without the necessity of stopping the lathe.

Another object of my invention is to afford more powerful driving means than have heretofore been used in lathes of the kind which involve the use of a friction clutch.

Another object of my invention is to provide a clutch mechanism for driving the lathe so that the mechanical efficiency of the driving means will not be lessened by defective action, if any, of the clutches.

Another object of my invention is to provide an arrangement of positive and friction clutches so arranged that the positive clutch will engage in advance of the friction clutch so that the positive clutches engage under no load and the later application of the power through the friction clutch is gradual and avoids any sudden or violent jarring or abuse of the mechanism when starting the lathe or changing the speed.

My invention consists in providing positive clutch mechanism upon the back gear sleeve of a lathe adapted to engage any one of a plurality of gear runs or drives and to bring into action on the main spindle, in sequence, the primary drive (in this case a three-step cone pulley) through the medium of a friction clutch, consisting of a friction clutch ring and means for operating said clutches, comprising a conveniently located handle and parts connecting it with the positive and friction clutch operating members.

My invention consists more particularly in the combination and arrangement of parts and in the details of construction as herein set forth and claimed.

Figure 1:
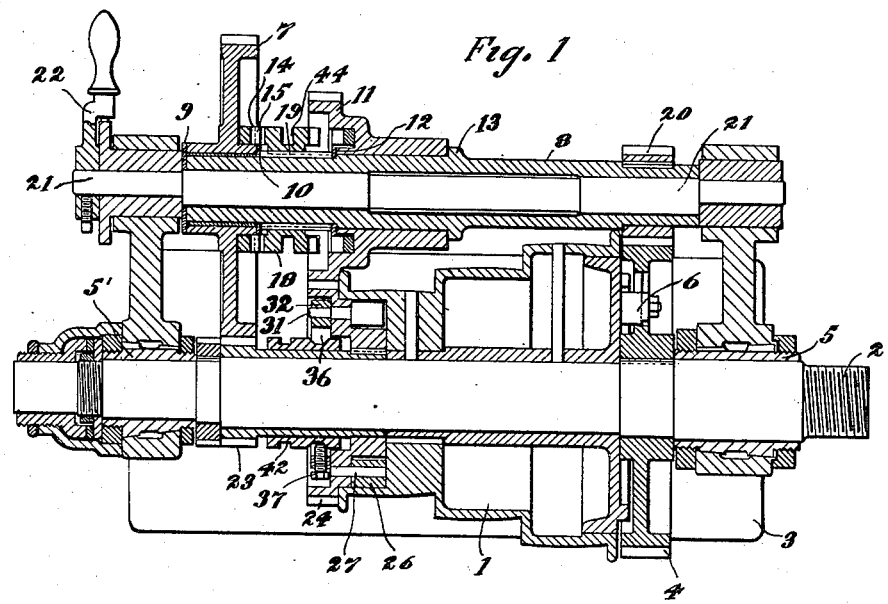
Figure 2:
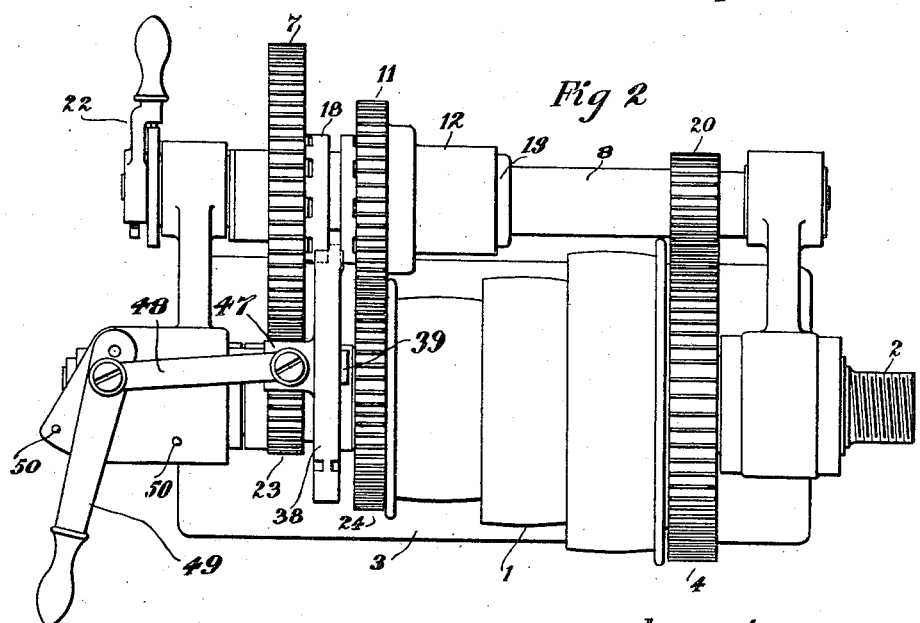

In the accompanying drawings, which serve to illustrate the construction, application and use of my invention: Figure 1 is a sectional plan view of a lathe head on the line 1—1 of Fig. 3; Fig. 2 is a top view of the lathe head mechanism; Fig. 3 is an end elevation of a lathe head embodying my invention; Fig. 4 is an end elevation showing the driving pinions for the back gears and the friction clutch operating lever; Fig. 5 is a combined vertical and horizontal section through Fig. 4 on the lines 1—2 and 2—3; Fig. 6 is an end view of Fig. 5 showing the expanding ring of the friction clutch; Fig. 7 is a top view of the friction clutch, friction clutch operating spool, clutch actuating bar with its connecting link and operating lever; and Fig. 8 is a side elevation of the clutch actuating bar detached.

In the embodiment of my invention as illustrated and which shows a preferred construction, 1 represents a three step cone driving pulley loosely mounted upon the lathe spindle 2 which is journaled in bearings 5 and 5' in an ordinary lathe head 3. The face gear 4 is keyed upon said spindle between the front spindle-bearing 5 and the cone 1 to which latter it can be connected or disconnected as required by any suitable means such as the sliding lock bolt 6.

Back gear 7 is loosely mounted on the back gear sleeve 8 between the collars 9 and 10 and back gear 11 is also loosely mounted on said back gear sleeve 8 between collar 12 and shoulder 13. The back gears 7 and 11 are each provided upon one face with projections 14 and interdental spaces 15 adapted to engage similar coöperating interdental spaces 16 and projections 17 on the positive clutch 18 which is slidably mounted on the back gear sleeve 8 between said gears 7 and 11 and is caused to rotate with said sleeve 8 by means of key 19. Pinion 20 is keyed upon sleeve 8 and is adapted to engage and drive the face gear 4. The back gear sleeve 8 is loosely mounted upon the back gear eccentric shaft 21 which is provided with a lever 22 by means of which said shaft is partially rotated to throw said back gears 7 and 11 and pinion 20 out of mesh or driving connection with their corresponding or engaging gears 23 and 24 and face gear 4 respectively. The gear 23 is loosely mounted to rotate on the spindle 2 but is non-slidable lengthwise thereon, and the gear 24 is mounted and keyed on the extended hub of gear 23.

The driving cone 1 on its smaller end is provided with an annular recess within which recess a split friction clutch ring 26 is mounted and secured by pin 27 to the gear 24. The split friction clutch ring 26, as clearly shown in Fig. 6, is spaced apart opposite said pin 27 and is provided with suitable bearing faces 28 and 29 adapted to be engaged and acted upon by the expanding key 30 supported therein by a cylindrical stem 31 mounted in the web of gear 24. Friction expanding clutch lever 32 is fixed upon the stem 31 and is confined to move between the gear 24 and the guide plate 33. A spool 34 is slidably and rotatably mounted upon the extended hub of gear 23. Said spool is provided with a tapered annular groove 36 the sides of which impinge and act upon an adjustable and lockable screw 37 mounted in the free end of friction expanding clutch lever 32. The screw 37 provides adjustment for taking up the wear as well as first adjustment in setting friction ring 26 so that said friction ring will properly perform its functions, namely that of engaging the primary driver (in this case a three-step cone pulley) to drive the lathe spindle 2 through the action of the intermediate gearing when in driving connection with it.

In operating the spool it is thrown either to the right or left so that the screw 37 impinges and rides up the corresponding incline faces of the tapering groove and the movement of said spool is of such extent as to bring said screw into engagement on the outer cylindrical surface adjacent said groove thereby locking the friction clutch ring 26 in its expanded or clutched position. It will be seen that the clutch ring extending as it does almost over the complete circumference of a circle engages a large area of the cone pulley 1 and forms a powerful binding engagement therebetween.

In order to obtain the greatest efficiency in the frictional engagement of the clutch ring with the cone pulley the bearing for the pin 27 should be slightly larger than said pin in order to allow said ring to expand substantially uniformly throughout its length and thus firmly clutch the engaging part of the cone pulley 1 and at the same time the construction as described prevents any side thrusts upon the spindle which would cause or tend to make it run out of true.

I provide a clutch actuating bar 38 as clearly shown in Figs. 7 and 8, said bar being slidably mounted upon a stud 39 which is supported by the rear spindle bearing cap 40. Said actuating bar is provided upon its lower edge with a projection 41 which is adapted to enter an annular channel 42 in the spool 34 to actuate said spool. Said bar is also provided with a tongue 43 which enters an annular recess 44 in the clutch 18 whereby said clutch may be operated. I preferably provide a counterweight 45 on one end of the bar 38 to relieve undue frictional resistance on the key 46 when sliding the clutch actuating bar 38 on the stud 39. The clutch actuating bar 38 is provided with a hub 47 to which is pivotally connected a link 48 which link is also pivotally attached to the operating lever 49 suitably fulcrumed on the rear cap. The tongue 43 is of sufficient length to remain in engagement with the annular recess 44 when the back gears are out of mesh as well as at all other times.

It will be understood from the foregoing that the back gears are of a well known construction and operate in the usual manner by means of an eccentric shaft of the usual type to engage and disengage all of the gears mounted upon the back gear sleeve 8 from their corresponding gears mounted upon the main spindle 2. The manner of accomplishing the different drives is as follows: The cone pulley 1, by means of the expanding clutch ring 26, drives the double cone gears 23 and 24 with which gears the back gears 7 and 11 are in driving connection when the handle 22 is in position to cause these gears to be meshed with each other thereby affording two separate and distinct drives for the lathe spindle 2, driving in each case through friction clutch 18, back gear sleeve 8, face gear pinion 20 and face gear 4 keyed to the spindle 2. The positive clutch 18 and the friction clutch 26 are moved simultaneously by the clutch actuating bar 38 which latter bar is caused to slide on the stud 39, (on which it is mounted) by means of the handle 49 and the connecting link 48. The aforesaid conjoint movement to the right or left of the clutch operating mechanism causes clutch 18 to first clutch with either of the gears 7 and 11 respectively and in both instances the driving cone 1 is engaged in sequence by the friction clutch ring 26. Thus it is plain that the two back gear speeds are readily available at all times without stopping the lathe and without any jarring or damage whatever to the machine as the positive clutch 18 is always engaged under no load and it requires the further meshing and complete engagement of the clutch 18 to bring into the drive the initial driving pulley 1 by means of the friction clutch expanding ring 26. It will thus be noted that the positive clutch 18 and the friction clutch 26 are operatively connected together through the medium of clutch actuating bar 38 and that said actuating bar is adapted to be operated first to throw the positive clutch 18 into operative engagement with either back gear 7 or back gear 11 as may be desired according to the speed wanted and by continuing the movement of the lever 49 in the same direction either to the right or left as the case may be, the spool 34 engages the screw 37, thereby operating the friction expanding clutch lever 32 whereby the split friction clutch ring 26 is brought into frictional holding engagement with the cone pulley 1 while the further and comlpete engagement of the positive clutch 18 with either back gear is being effected. The positive stop pins 50 for the lever 49, absolutely prevent the lever or any of the parts connected therewith from causing, by their action, any end thrusts whatever in any of the bearings or rotating parts of the lathe.

My invention is capable of considerable modification without material departure from the scope or spirit thereof and I do not, therefore, wish to be confined to the particular construction set forth.

While I have shown my invention as specially applicable for use upon lathes I desire it to be understood that my invention comprehends any use to which it may be put.

Having described my invention, what I claim as new is:

1. In lathe head driving mechanism, a spindle, a face gear in driving connection with said spindle, a pulley on said spindle, driving gears loosely mounted on said spindle, a friction clutch carried by said gears and adapted to engage said pulley, a back gear shaft, back gears loosely mounted thereon and adapted to mesh with said driving gears, a positive clutch adapted to engage either of said back gears, a pinion in driving connection with said shaft and with said face gear, and means to first engage said positive clutch with either of said back gears and then to engage said friction clutch with said pulley, substantially as set forth and for the purposes specified.

2. In lathe head driving mechanism, a spindle, a face gear in driving connection with said spindle, a cone pulley on said spindle, driving gears loosely mounted on said spindle, a friction ring carried by said gears and adapted to clutch said cone pulley, a back gear shaft, a sleeve on said shaft, back gears loosely mounted on said sleeve and adapted to mesh with said driving gears, a positive clutch on said back gear sleeve between said back gears adapted to engage either of said back gears, a pinion in driving connection with said sleeve and with said face gear and means to first engage said positive clutch with either of said back gears and then engage said friction clutch with said cone pulley, substantially as set forth and for the purposes specified.

3. In lathe head driving mechanism, back gears suitably mounted, a positive clutch adapted to engage said back gears, a spindle, a pulley loosely mounted on said spindle, driving gears loosely mounted on said spindle and engaging said back gears, a friction clutch adapted to engage said pulley and said driving gears, said clutches acting in sequence, the positive clutch action preceding the engaging action of the friction clutch.

4. In lathe head driving mechanism, back gears suitably mounted, a positive clutch adapted to engage either of said back gears, driving means, a friction clutch adapted to frictionally engage said driving means, driving gears adapted to engage said back gears, a connection between said positive clutch and said friction clutch and a common actuating means for said clutches whereby they are operated in sequence.

5. In lathe head driving mechanism, back gears suitably mounted, a positive clutch adapted to alternately engage said back gears, driving means, a friction clutch adapted to frictionally engage said driving means, driving gears engaging said back gears, a clutch actuating bar adapted to operate said clutches in sequence, a link pivotally connected to said bar, and an operating handle to which said link is pivoted, substantially as set forth.

6. In driving mechanism, a friction clutch, coöperating engaging members, a positive clutch, coöperating engaging members, means for connecting said clutches and common means adapted to effect the operation of said clutches in sequence.

7. In driving mechanism, a friction clutch, coöperating engaging members, a positive clutch, coöperating engaging members, means for connecting said clutches and common means adapted to effect the operation of said clutches.

8. In lathe head driving mechanism, a spindle, a face gear in driving connection with said spindle, a pulley on said spindle, driving gears loosely mounted on said spindle, a clutch ring carried by said driving gears and adapted to clutch said pulley, a spool mounted between said driving gears and having an annular tapering groove therein, an expanding key engaging said clutch ring, a lever for said key, a screw on said lever extending into said tapering groove and adapted to impinge upon the inclined surfaces thereof and upon the cylindrical surfaces of the spool, a back gear shaft in driving connection with said face gear, back gears on said shaft adapted to engage said driving gears, a positive clutch for engaging said back gears, a connection between said positive clutch and said friction clutch operating mechanism, and means for operating said clutches in sequence.

9. In lathe head driving mechanism, a spindle, a face gear in driving connection with said spindle, a pulley having an annular recess in one end thereof on said spindle, driving gears spaced apart on a common hub and loosely mounted on said spindle, a friction ring carried by said gears and adapted to clutch said cone pulley, a polygonal key adapted to engage said friction ring, a lever secured to said key, a guide plate to confine said lever, a spool having a tapering annular groove and an annular channel, a screw extending from said lever into said tapering groove, a positive clutch, a clutch actuating bar engaging said channel and positive clutch, a stud on which said bar is slidably mounted, an operating lever suitably fulcrumed and a link pivotally connecting said lever and said clutch actuating bar whereby said bar may be moved to actuate said clutches in either direction in sequence, substantially as set forth and for the purposes specified.

10. In lathe head driving mechanism, a spindle, a face gear in driving connection with said spindle, a pulley on said spindle, driving gears loosely mounted on said spindle, a friction clutch carried by said gears and adapted to clutch said pulley, back gears in driving connection with said driving gears and face gear, a positive clutch between said back gears, a clutch actuating bar connecting said positive clutch and the friction clutch operating means, a lever, a link between said lever and said clutch actuating bar, and stop pins adapted to limit the movements of said lever, substantially as set forth and for the purposes specified.

11. In lathe head driving mechanism, a spindle, a face gear in driving connection with said spindle, a pulley loosely mounted on said spindle, driving gears loosely mounted on said spindle, a friction ring carried by said gears and adapted to clutch said pulley, a key for expanding said ring, a lever for said key, an adjustable screw for said lever, a spool mounted between said driving gears and having a tapering groove adapted to receive said screw and also having an annular channel, a back gear shaft, a sleeve on said shaft, back gears loosely mounted on said sleeve and adapted to mesh with said driving gears, a positive clutch on said back gear sleeve between said back gears adapted to engage either of said back gears, a pinion in driving connection with said shaft and with said face gear, a clutch actuating bar engaging said positive clutch and the channel of said spool and means for moving said clutch actuating bar.

EDWARD W. BLUM.

Witnesses:
JAMES N. RAMSEY,
MILDRED SCHOPP.

---

Copies of this patent may be obtained for five cents each, by addressing the "Commissioner of Patents, Washington, D. C."